United States Patent
Takahashi et al.

(10) Patent No.: US 7,164,484 B2
(45) Date of Patent: Jan. 16, 2007

(54) PRINT CONTROLLER, PRINT CONTROL METHOD AND PRINTER INCLUDING DETERMINATION TO STORE MACRO AS INSTRUCTION OR BITMAP

(75) Inventors: Shinichi Takahashi, Kawasaki (JP); Takahiro Miyoshi, Kawasaki (JP); Hirokazu Harada, Kawasaki (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 855 days.

(21) Appl. No.: 10/287,484

(22) Filed: Nov. 5, 2002

(65) Prior Publication Data
US 2003/0133149 A1 Jul. 17, 2003

(30) Foreign Application Priority Data
Jan. 17, 2002 (JP) ............... 2002-008991

(51) Int. Cl.
*B41B 1/00* (2006.01)
*G06F 15/00* (2006.01)
(52) U.S. Cl. .................. 358/1.13; 358/1.15
(58) Field of Classification Search ......... 358/1.13, 358/1.15
See application file for complete search history.

(56) References Cited

U.S. PATENT DOCUMENTS 4,622,546 A * 11/1986 Sfarti et al. ............ 345/551
6,567,179 B1 * 5/2003 Sato et al. .............. 358/1.15

FOREIGN PATENT DOCUMENTS

JP 10-138598 5/1998

* cited by examiner

*Primary Examiner*—Kimberly Williams
*Assistant Examiner*—Charlotte M. Baker
(74) *Attorney, Agent, or Firm*—Westerman, Hattori, Daniels & Adrian, LLP.

(57) ABSTRACT

A printer controller obtains high-speed bitmap generation processing while maintaining flexibility in macro definition when generating bitmap data from a macro-formed data. A processing unit calls macro data from a memory storing macro data to generate bitmap data. The processing unit determines effectiveness of bitmapping the macro instruction, to store into memory the bitmap data only when the bitmapped data is determined effective. Even in case of macro definition having degree of freedom, the data can be retained in a bitmap form. This enables to omit command analysis and expansion next time or after in macro control having flexibility in macro definition.

15 Claims, 9 Drawing Sheets

FIG. 2

| Data type | Command check item | | | | | |
|---|---|---|---|---|---|---|
| Text | Font | Point | Pitch | Symbol set | Line space | Angle |
| Graphic | Scale | User pattern | Direction | Absolute/ Relative | | |
| Image | Image resolution | | | | | |

FIG. 3

| ID NO. | Bitmap flag | Data | |
|---|---|---|---|
| ID = 1 | 0 | Length | Command, Data |
| ID = 2 | 1 | Bitmap size | Bitmap data |
| | | | |

| AAAA | 〒215 | B city C town 1-2-3 |
|---|---|---|
|  |  |  |
|  |  |  |
|  |  |  |
|  |  |  |
|  |  |  |
|  |  |  |

110 · 100

PRINT CONTROLLER, PRINT CONTROL METHOD AND PRINTER INCLUDING DETERMINATION TO STORE MACRO AS INSTRUCTION OR BITMAP

BACKGROUND OF THE INVENTION

1. Field of the Invention

The present invention relates to a print controller and a print control method for generating print page data according to print data, and a printer using the same, and more particularly a print controller and a print control method for improving processing speed utilizing a macro instruction and a printer using the same.

2. Description of the Related Art

With the improvement of data processing speed and communication speed in a computer, improved print speed is required for a printer of outputting data. The printer analyzes (emulates) print data (including commands and data) received from a host and develops these data to bitmap data and then prints out onto a medium using a printer engine.

Namely, printer job processing includes processing of analyzing print data and expanding to bitmap and processing of printing the bitmap data onto a print medium. As a high speed printing has been desired in recent years, it is required to shorten not only the print time but also the time for analysis and expansion of print data. However, in order to obtain high resolution as well as color printing, the time necessary for print data analysis and expansion becomes longer.

Meanwhile, in printer emulation, macro instructions, which is recorded a series of processing operation that includes rendering processing instructions and printer control, are often to perform print job processing. There are a variety of macro instructions ranging from a relatively simple processing instruction to a complicated image rendering processing or a control order, depending on the function or property of each instruction.

In a macro instruction, a set of orders (commands) sandwiched by the start of macro and the end of macro are handled as a single macro. By registering such a macro instruction (namely, a set of commands initiated by the start of macro and terminated by the end of macro), it becomes possible to simplify data description by calling the macro using either a simply defined macro name or a macro number assigned to each macro even when a multiple of operations are required in the job processing.

However, in the print job processing, a macro is called on a page-by-page basis to perform instruction analysis for printing a page. Therefore, in case identical macro instructions are called for a plurality of times in one print job, the first instruction processing is repeated for a plurality of times. This wastes processing time and therefore is not desirable for high speed printing.

To solve the aforementioned factor of print speed reduction, a method has been proposed (for example, in the official gazette of Japanese Unexamined Patent Publication No. Hei-10-138598). This proposal is illustrated referring to FIGS. 12 and 13. According to this prior art, as shown in FIG. 13, a macro data (macro instruction) is stored in a macro data storage 200. According to a macro expansion (call), a macro expansion portion 210 expands the called macro data to a bitmap and stores into a macro cash memory 220. On receipt of a macro expansion call, the macro expansion portion 210 determines whether the called macro has already been expanded into a bitmap data. If the macro has been expanded, the bitmap data is read out from the macro cash memory 220.

According to this prior art, a macro data once expanded to the bitmap data is stored in the cash memory. The bitmap data can be used next time the macro is called so as to avoid re-expansion of the macro data concerned. Thus high speed processing can be attained. One example is shown in FIG. 12. Using form image such as ruled lines 100 etc. in an address book being expanded into macro cash memory 220, high speed printing of the address book becomes possible when character data 110 is expanded to a bitmap.

According to the prior art, all macro instruction which is registered as macro is expanded into a bitmap to store into a cash memory. However, there is a problematic case that this bitmap expansion is not effective for certain macro instructions. One typical example is illustrated below in the case of PCL known as a printer emulation function (by Hewlett-Packard Company) or the like, in which a macro can be registered freely. When a macro having been registered and cashed as a bitmap data is called, the print result may possibly differ depending on the environment (condition) before the time of registration of the macro concerned.

For example, according to the prior art, in case font is not specified in the macro definition, a bitmap data is cashed with font and character size being determined either based on default values or by the environment before the time of macro registration. Therefore, when the macro specified with a certain font and character size is called aiming to print the same character with different font and size, the bitmap data having the font and size at the time of cashing is called. Thus the printout as a result of the macro call may have different font and size.

In such a case according to the prior art, the macro definition cannot produce correct printout desired by a user. To prevent user's confusion, the prior art method cannot be applied to these macro. As a result it becomes difficult to obtain high speed processing.

SUMMARY OF THE INVENTION

Accordingly, it is an object of the present invention to provide a print controller, a print control method and a printer using the same for performing high speed print processing no matter how a macro is defined.

It is another object of the present invention to provide a print controller, a print control method and a printer using the same for performing accurate print processing with a high speed by automatically determining from a macro instruction whether or not cashing of bitmap data is effective.

It is still another object of the present invention to provide a print controller, a print control method and a printer using the same for performing accurate print processing with a high speed while maintaining degree of freedom in macro definition.

In order to attain above objects of the present invention, in a print controller for generating bitmap data according to print data received from a host and outputting to a printer engine, the print controller includes; a memory for storing macro data; and a processing unit for generating the bitmap data by calling the macro data from the memory according to a macro data calling instruction being included in the print data. The processing unit determines whether the received macro instruction is an effective instruction set to be expanded and stored as the bitmap data and stores the bitmap data being expanded from the instruction set into the memory when the instruction set is determined effective, while stores the instruction set into the memory as the macro data when the instruction set is determined ineffective.

According to the present invention, a print control method includes the steps of; generating the bitmap data by calling a macro data stored in a memory according to a macro data calling instruction being included in the print data from a host; determining whether the received macro instruction is an effective instruction set to be expanded and stored as the bitmap data; for effective instruction set, storing the bitmap data being expanded from the instruction set into the memory; and for ineffective instruction set, storing the instruction set into the memory as the macro data.

According to the present invention, it is determined whether or not to be effective that the macro instruction is stored as the expanded bitmap data. The macro instruction set is stored when the bitmap expansion is determined ineffective, while the macro stored is registered as bitmap data when the bitmap registration is determined effective. Accordingly, although the macro is defined in various forms, bitmap data can be registered as a macro which produces unchanged print output. This enables to avoid repetitive command analysis and expansion next time and after, to obtain high speed processing even in case of macro control having flexibility in macro definition.

According to the present invention, preferably the processing unit expands the instruction set into a bitmap data according to the received macro instruction, determines the effectiveness after generating the bitmap data and selects either the bitmap data or the instruction set. This enables to utilize the data at the time macro instruction is received.

Also, according to the present invention, preferably an information table for storing check items is provided for determining whether the received macro instruction is an effective instruction set to expand and retain as the bitmap data. This facilitates the determination processing easily coping with various printer description languages.

Further according to the present invention, preferably the memory stores an identifier of the macro data, a flag indicating whether the macro data is the bitmap data or the instruction set, and the macro data. This enables to identify macro types and to generate bitmap data easily.

According to the present invention, preferably the information table stores the check items corresponding to respective data types of the macro data, enabling to determine effectiveness depending on data types easily.

Further scopes and features of the present invention will become more apparent by the following description of the embodiments with the accompanied drawings.

BRIEF DESCRIPTION OF THE DRAWINGS

FIG. 2 shows a configuration diagram of a macro data information table shown in FIG. 1.

FIG. 3 shows a configuration diagram of a macro data storage shown in FIG. 1.

DETAILED DESCRIPTION OF THE PREFERRED EMBODIMENTS

The preferred embodiment of the present invention is described hereinafter in order of a printer, macro control processing and other embodiments, referring to the charts and drawings, wherein like numerals or symbols refer to like parts.

[Printer]

Figure 1:
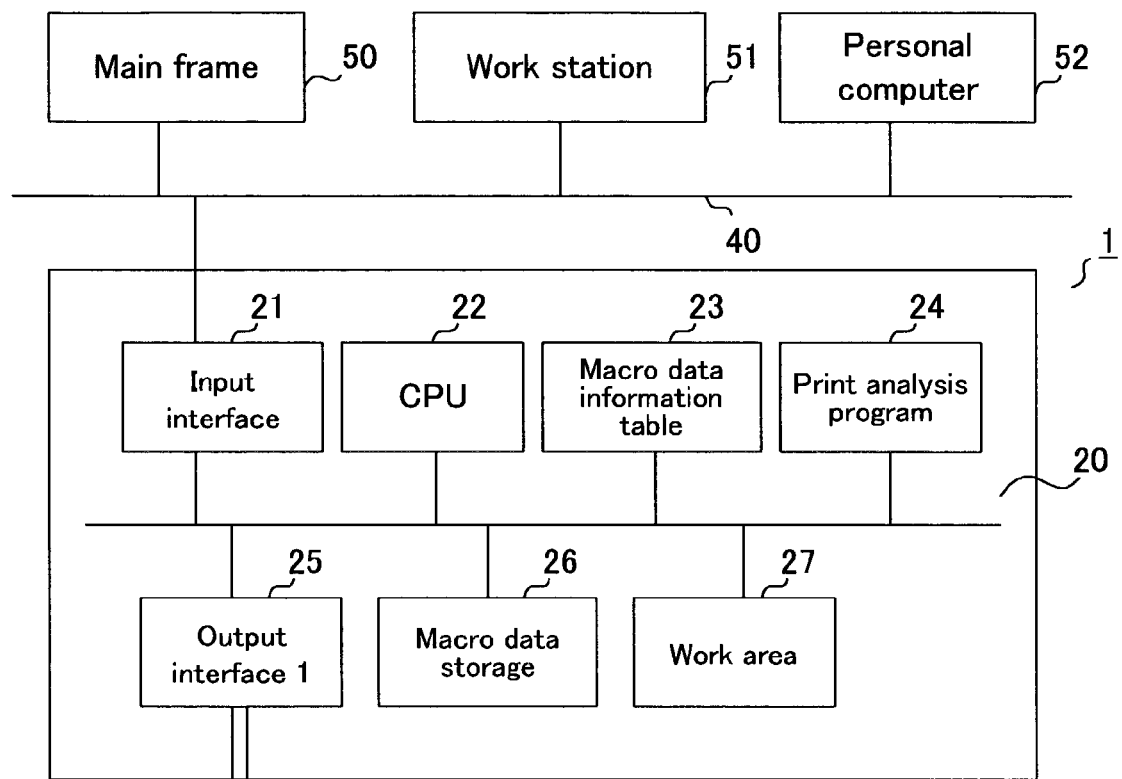
FIG. 1 shows a configuration diagram of a printer according to one embodiment of the present invention.
Figure 1:
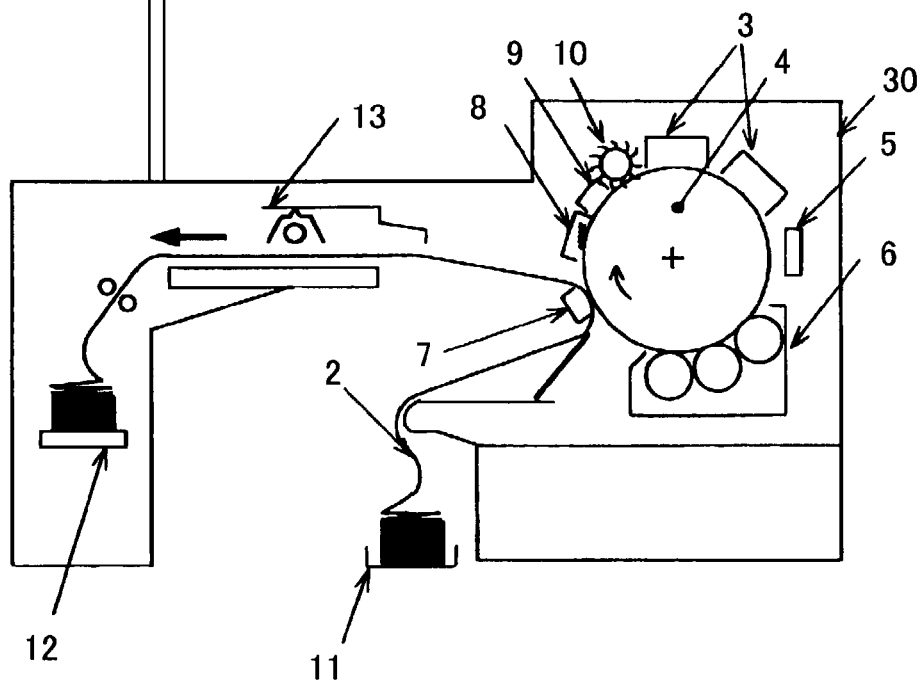

FIG. 1 shows a configuration diagram of a printer according to one embodiment of the present invention. FIG. 2 shows a configuration diagram of a macro data information table shown in FIG. 1. Also, FIG. 3 shows a configuration diagram of a macro data storage shown in FIG. 1.

More specifically, FIG. 1 shows a network system configuration which connects an electrophotographic printer 1 handling continuous paper as a printer related to an embodiment of the present invention. High speed printer 1 is connected to multi-platforms such as a mainframe 50, a workstation 51 and a personal computer 52 through the interface of a network 40 or the like. Here, the printer 1 has a multi-emulation function (i.e. emulation function capable of handling a plurality of page description languages) so as to correspond to print data being output from a plurality of platforms.

The printer 1 includes a print controller 20 and an electrophotographic printer engine 30. The electrophotographic printer engine 3 prints on continuous paper 2. The print controller 20 controls the printer engine 30. Now, the configuration and operation of the printer engine 30 will be described hereafter.

The continuous paper (folded paper) 2 being loaded on a paper hopper 11 is carried continuously through a transfer unit 7 and a fixing unit 13 by a carriage system and is accommodated into a stacker 12. A photosensitive drum 4 rotating clockwise is uniformly charged by a charger 3. Thereafter an image is exposed by an optical system 5. Thus an electrostatic latent image corresponding to the image is produced on the photosensitive drum 4. The electrostatic latent image produced on the photosensitive drum 4 is then developed by a developing unit 6. Thereafter a toner image on the photosensitive drum 4 is transferred to the continuous paper 2 by the transfer unit 7.

After this transferring, charges on the photosensitive drum 4 are eliminated by a charge eliminator 9. Residual toner is cleaned by both a cleaner blade 8 and a cleaner brush 10. The toner image transferred on the continuous paper 2 is flash-fixed by a flash fixing unit 13. The continuous paper 2 is then accommodated in the stacker 12.

Meanwhile, the printer controller 20 includes an input interface unit 21, a CPU 22, a macro data information table 23, a print analysis program 24, an output interface unit 25, a macro data storage 26 and a work area 27. Here, the print analysis program 24 is illustrated as one of the control program performed by CPU 22, which is normally stored in a non-volatile memory. Further, the macro data information table 23, the macro data storage 26 and the work area 27 are configured in a memory.

Print data is transferred to the printer 1 from the mainframe 50, the workstation 51 and the personal computer 52 through the network 40. In the printer 1, the print data is received by the input interface unit 21. The data is then transferred to the print analysis program 24 to be executed by CPU 22. This print analysis program 24 expands the print data to a bitmap using the work area 27.

Here, when a macro instruction is included in the print data, the print analysis program 24 checks whether there exists a macro data being expanded from the macro instruction by referring to the macro data storage 26. In the macro data storage 26, there are stored an identification ID of the registered macro instruction, a bitmap flag indicating whether or not a bitmap data has been stored, and a stored macro data (commands and data having been registered as a macro, or a bitmap data produced by the macro instruction), as shown in FIG. 3.

When the bitmap data already exists, a bitmap data having been expanded from the macro instruction is called from the macro data storage 26 and is stored into the bitmap memory in the work area 27.

On the other hand, when the bitmap data does not exist, the print analysis program 24 continues expansion to bitmap. More specifically, when the macro instruction is a macro call, macro data (commands and data) in the macro call instruction being stored in the macro data storage 26 is executed to expand to a bitmap. Also, when the macro instruction is a macro start instruction, the commands and data sandwiched between the start of macro start and the end of macro in the print data are executed to expand to a bitmap. The expanded bitmap data is then stored into the bitmap memory in the work area 27.

Next, information is stored as a bitmap so as to make the macro data expansion unnecessary next time or after. However, depending on the macro data, print result to be obtained next time the macro is called may not be the same as the print result obtained first. Considering this, only macro data which can produce unchanged print result is retained as a bitmap. The criterion of determining whether to retain or not to retain the bitmap is stored in the macro data information table 23.

In the macro data information table 23, command check items corresponding to data types are stored, as shown in FIG. 2. Namely, commands are stored for determining from a macro instruction whether unchanged print result may be produced from the bitmap data. For example, in case the data contains a text, commands specifying font, point, pitch, symbol set (such as JIS, EUS), line interval and character inclination angle are registered as the check commands.

Meanwhile, in case the data contains a graphic figure, commands specifying scale, user pattern (painting pattern etc.), print direction and position (absolute/relative) are registered as the check items. Also, in case the data contains an image, a command specifying image resolution is registered as the check item.

After the bitmap expansion, the print analysis program 24 checks whether the check items stored in the macro data information table 23 exist in the macro instruction concerned, and determines whether the bitmap is to be retained or the retention is to be carried out using macro-formed commands and data. According to this determination, either bitmap data or macro-formed commands and data is retained together with a macro ID in the macro data storage 26.

In such a way, when the data is registered as a bitmap, it becomes unnecessary to expand with analyzing commands from next time. This enables high speed processing in macro control having flexibility in macro definition.

[Macro Control Processing]

Figure 4:
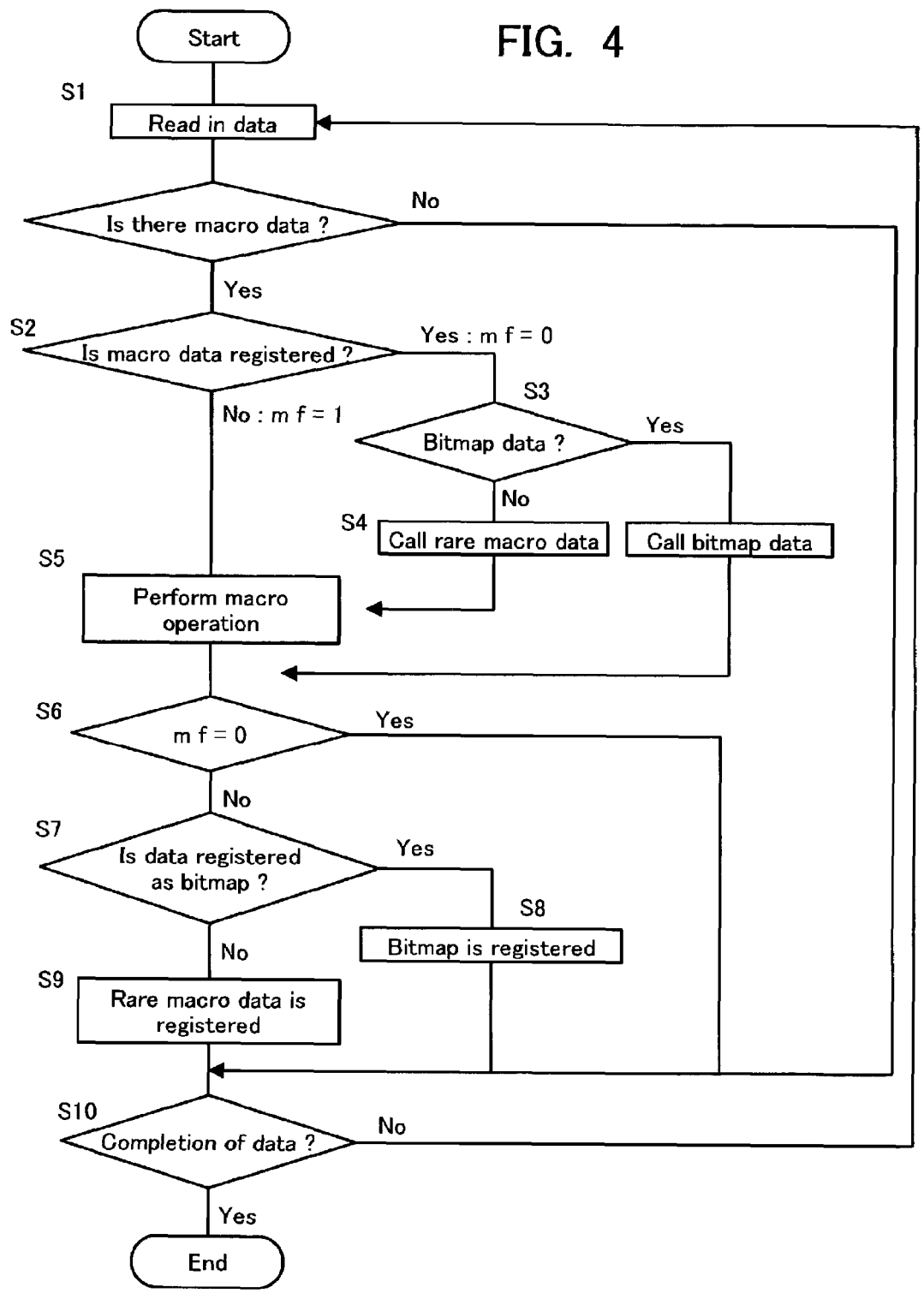
FIG. 4 shows a flowchart of macro control processing according to one embodiment of the present invention.
Figure 5:
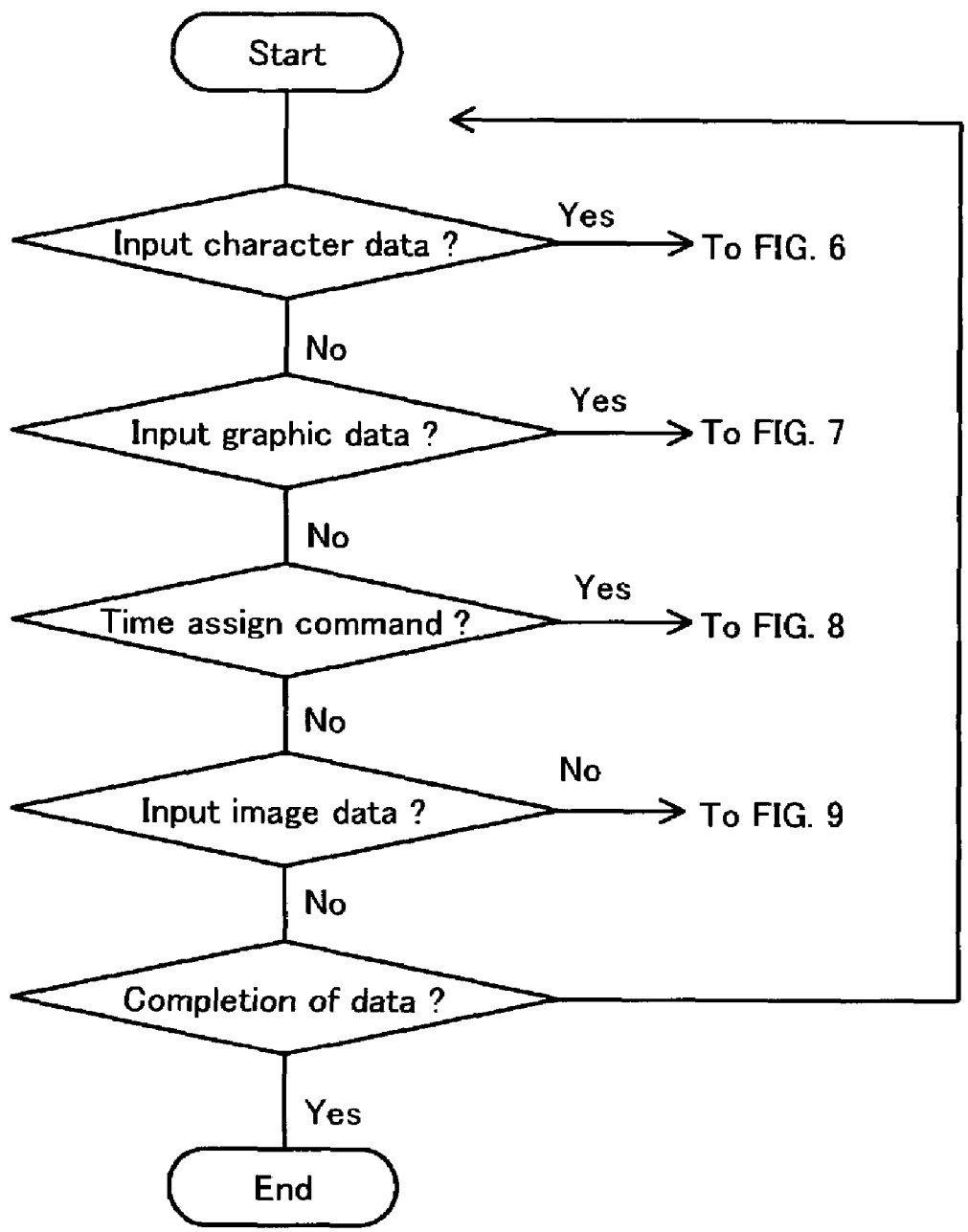
FIG. 5 shows a flowchart of effectiveness determination processing shown in FIG. 4.
Figure 6:
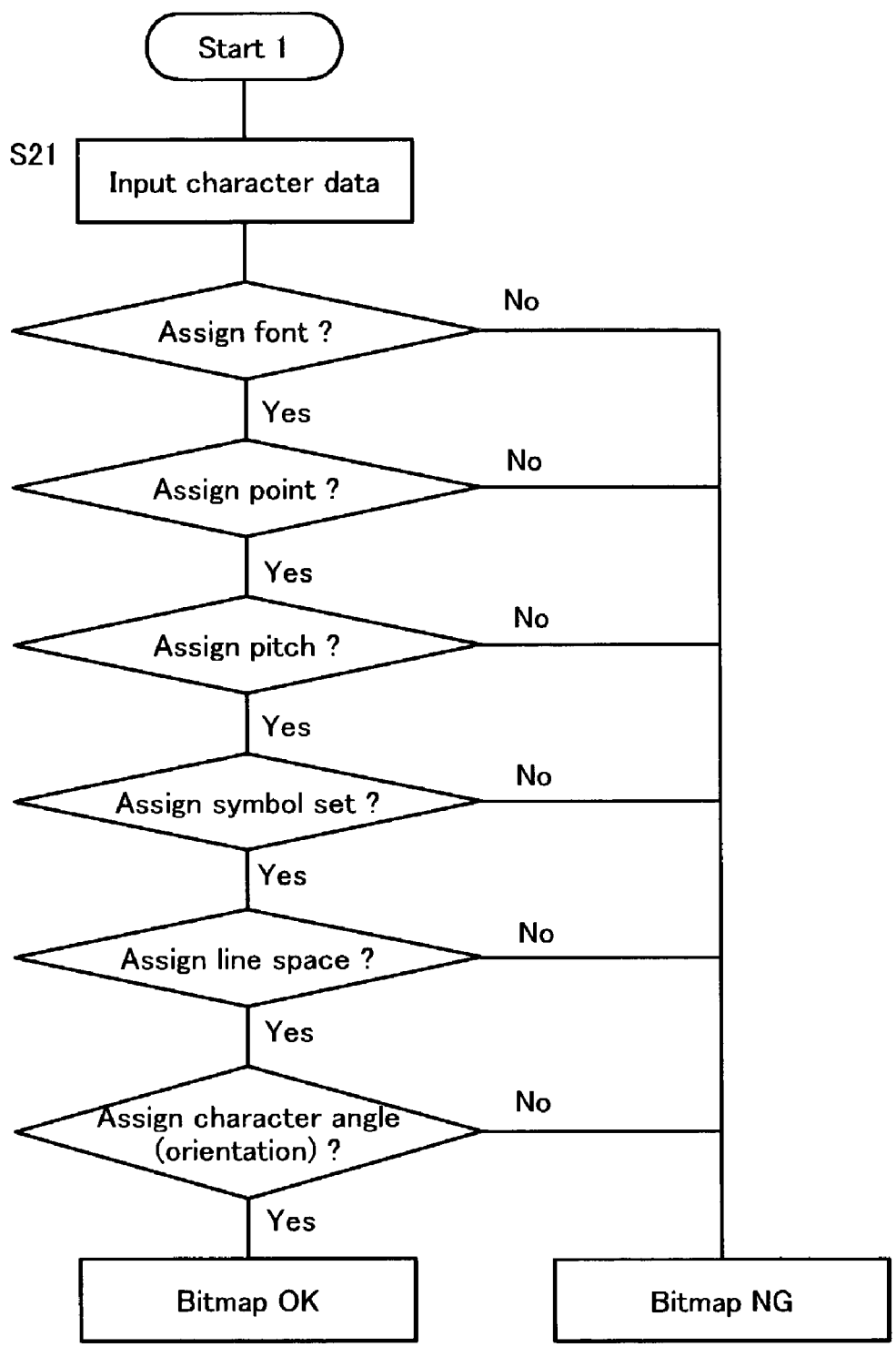
FIG. 6 shows a flowchart of determination processing for a character data input shown in FIG. 5.
Figure 7:
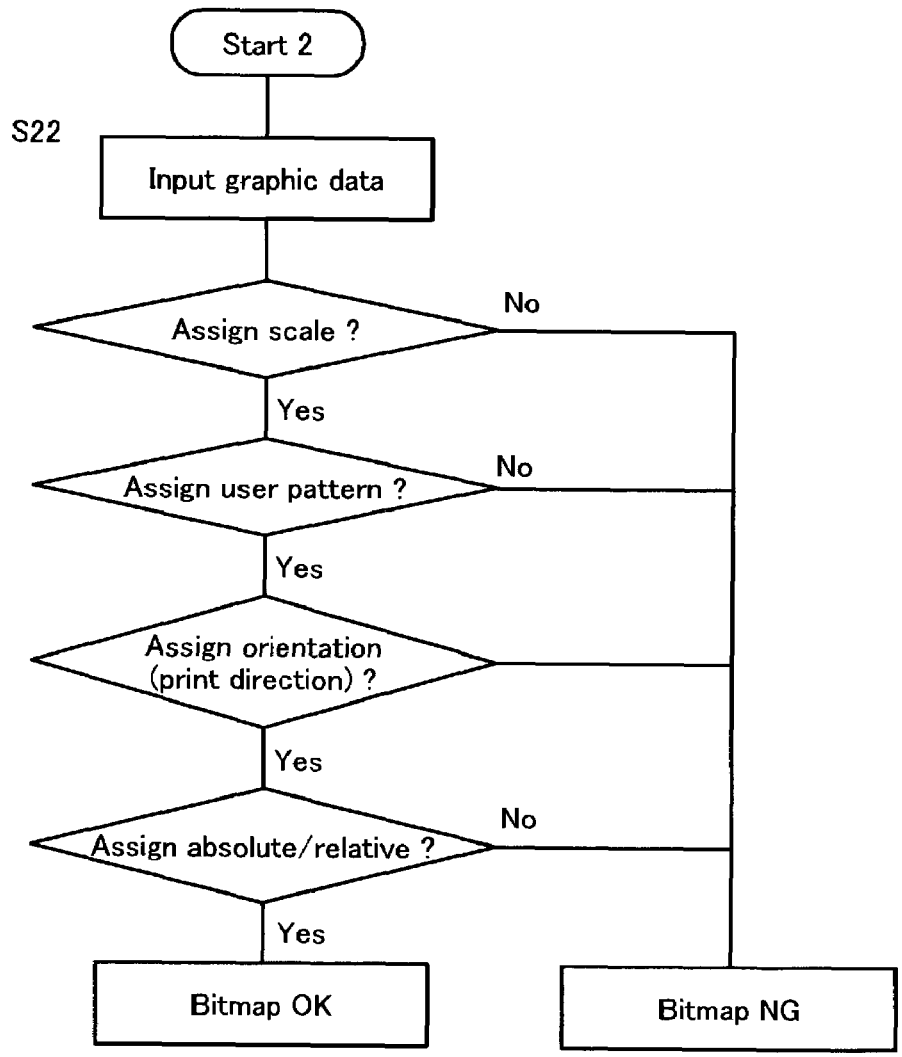
FIG. 7 shows a flowchart of determination processing for a graphic data input shown in FIG. 5.
Figure 8:
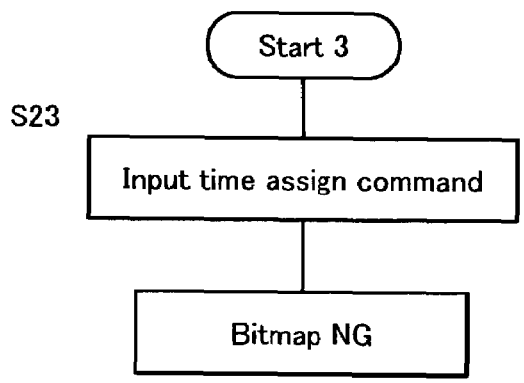
FIG. 8 shows a flowchart of determination processing for a time assignment command shown in FIG. 5.
Figure 9:
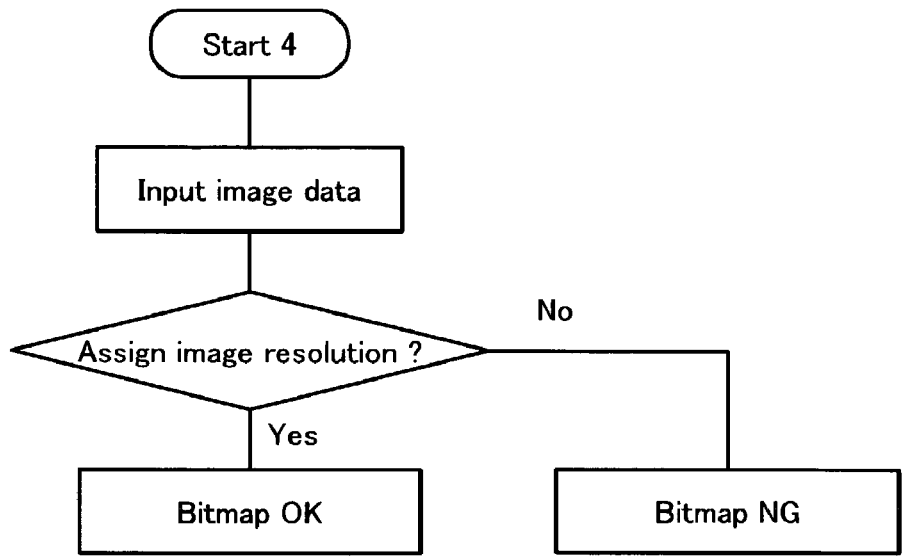
FIG. 9 shows a flowchart of determination processing for an image input shown in FIG. 5.

Macro control processing executed by the print analysis program 24 is illustrated referring to FIGS. 4 to 9. FIG. 4 shows a flowchart of macro control processing according to one embodiment of the present invention. FIG. 5 shows a flowchart of determination processing shown in FIG. 4. FIG. 6 shows a flowchart of determination processing for a character data input shown in FIG. 5. FIG. 7 shows a flowchart of determination processing for a graphic data input shown in FIG. 5. FIG. 8 shows a flowchart of determination processing for a time assignment command shown in FIG. 5. Further, FIG. 9 shows a flowchart of determination processing for an image data shown in FIG. 5.

Now, referring to FIG. 4, the macro control processing is explained hereafter.

(S1) The print analysis program 24 reads print data on a certain quantity unit basis and determines whether a macro instruction (here, either a macro start or a macro call) is included. If no macro instruction is included, the process proceeds to step S10.

(S2) If a macro instruction is included, it is checked, referring to the macro data storage 26, whether the macro data to be expanded from the macro instruction has already been registered. As shown in FIG. 3, there are stored in the macro data storage 26 a registered macro instruction identification ID, a bitmap flag indicating whether a bitmap data is stored, and a stored macro data (macro-registered command, data or a bitmap data as a result of the macro instruction execution).

(S3) When it is determined from the ID that the processing result of the macro instruction concerned (macro data) exists in a registration area of the macro data storage 26 (m_f=0), it is checked using the bitmap flag whether the data is stored in the form of bitmap data. If the data is a bitmap data, the bitmap data is called and is pasted into an expansion area of the work area 27.

(S4) On the other hand, if the data is not a bitmap data, in other words the macro data is a raw data (in a print language format), the macro data (commands and data) is called and is expanded to a bitmap format. The expanded bitmap data is then pasted into the expansion area of the work area 27.

(S5) If the macro data to be expanded from the macro instruction has not been registered in the macro data storage 26 (m_f=1), or in case of a macro registration command, the commands and data sandwiched between the start of macro and the end of macro are expanded to a bitmap in the same way as step S4, and are pasted into the expansion area of the work area 27 to perform a print data generation processing.

(S6) If the macro data has been registered (m_f=0), it is no more necessary to register. Therefore the procedure proceeds to step S10.

(S7) After the print data generation processing is completed, if the macro data concerned has not been registered (m_f=1), it is necessary to register the macro data newly. However, in order to perform high speed processing at the time of next macro call, the expanded bitmap is registered depending on condition. It is determined whether to register as a bitmap or to register a raw data (commands and data sandwiched by the start of macro and the end of macro)

without expansion by referring to the macro data information table 23. The details will be explained later referring to FIGS. 5 to 9.

As mentioned earlier, the macro data information table 23 is a database in which effectiveness of prior execution is recorded for each macro data. When a macro instruction is read in, the above determination is carried out referring to the macro data information table 23 against each command constituting a macro instruction.

This macro data information table 23 is required to prepare in advance and to be able to refer to during the processing concerned. Here, an instruction set unable (or ineffective) to register in advance is, for example, a macro data which includes a command for allocating the time data indicating the generation time of each page as a print data. In such a case, it makes no sense to process macro data in advance and to maintain the result thereof.

(S8) Only for the macro data having been determined in step S7 that registration in advance is possible, the macro data execution result (bitmap data) being expanded during the processing concerned is stored in an execution result registration area of the macro data storage 26. Here, each macro identifier ID and the macro data execution result are registered in the macro data execution result registration area of the macro data storage 26. The macro identifier ID is used for determining whether a macro instruction to be processed later has already been registered. This identifier ID has corresponding relation with each macro execution result.

(S9) With regard to macro data having been determined in step S7 that registration in advance is not possible, the commands and data before expansion in the processing concerned are retained in the execution result registration area of the macro data storage 26. Here, in the macro data execution result registration area, each macro identifier ID and the macro data execution result are registered in the macro data execution result registration area. The macro identifier ID is used for determining whether a macro instruction to be processed later has already been registered, having corresponding relation with each macro execution result.

(S10) The above-mentioned processing is repeated till the completion of entire spool data.

In step S1, with respect to print data having been determined to be not a macro instruction, ordinary analysis and bitmap expansion are carried out. The bitmap data being stored in the expansion area of the work area 27 is transferred to the printer engine 30 through the output interface unit 25 on a page-by-page basis.

Thus, the bitmap expansion result of macro data is retained only in case that a plurality of pages which call the identical macro data are included in a job and that certain conditions are satisfied. Accordingly, even in case of macro control to which flexibility is applied to the macro definition, it becomes not necessary to perform expansion processing repeatedly each time macro data is specified. This results in reducing time required for print page data generation processing.

Next, the determine processing in step S7 will be explained using FIGS. 5 to 9. Here, the explanation is given for character data, graphic data, time assignment command and image data as data types capable of defining macros.

(S20) As shown in FIG. 5, a macro instruction type, i.e. either character data (text) input, graphic data input, time assignment command or image data input is determined.

(S21) If character data input, the process proceeds to Start 1 shown in FIG. 6, in which whether instructions defined by macro instruction include a command to specify text check items stored in the macro data information table 23. Namely, it is determined whether commands specifying either font, point, pitch, symbol set (such as JIS, EUS, etc.), line interval or character inclination angle are included. In case entire specification commands are included, the print result to be obtained next time will remain the same. Therefore to perform bitmapping (registration using the bitmap) is determined to be acceptable. On the other hand, in case at least one specification command is not included, the print result to be obtained next time of the macro call may possibly vary. Therefore it is determined the bitmapping is unacceptable.

(S22) When the data indicates a graphic figure, the process proceeds to Start 2 shown in FIG. 7, in which whether instructions defined by macro instruction include a command to specify graphic check items stored in the macro data information table 23. Namely, it is determined whether there is included any command to specify either scale, user pattern (painting pattern etc.), print direction or position (absolute/relative). In case entire specification commands are included, the print result to be obtained next time will remain the same. Therefore to perform bitmapping (registration using the bitmap) is determined to be acceptable. On the other hand, in case at least one specification command is not included, the print result may possibly be changed next time the macro is called. Therefore it is determined the bitmapping is unacceptable.

(S23) When the data is a time assignment command, the process proceeds to Start 3 shown in FIG. 8, in which whether instructions defined by macro instruction include a command to specify check items related to time assignment in the macro data information table 23. The print content to be performed next time the macro is called is changed. Therefore it is determined the bitmapping is unacceptable.

(S24) When the data indicates an image, the process proceeds to Start 4 shown in FIG. 9, in which whether instructions defined by macro instruction include a command to specify image check items stored in the macro data information table 23. Namely, it is determined whether there is included the command to specify image resolution. In case this specification command is included, the print result to be obtained next time will remain the same. Therefore to perform bitmapping (registration using the bitmap) is determined to be acceptable. On the other hand, in case the specification command is not included, there is the item (resolution) which may be changed next time the macro is called. Therefore it is determined the bitmapping is unacceptable.

In such a way, by preparing a table for check items, it becomes possible by changing the table contents to cope with the case that a variety of macro definition is introduced. Further, it becomes possible to set check items corresponding to print environment.

Figure 10:
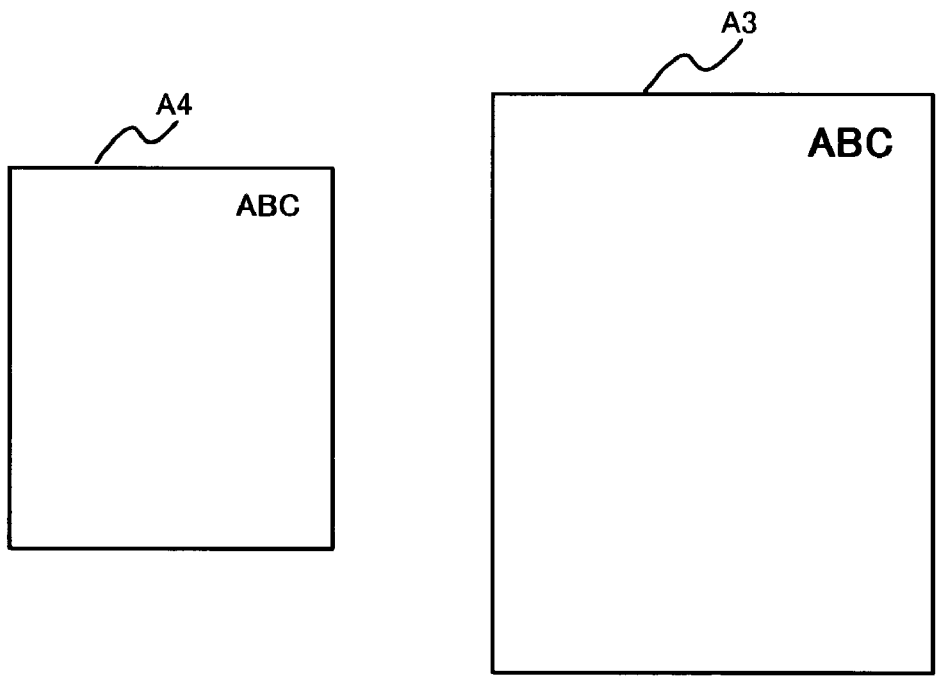
FIG. 10 shows an explanation diagram of a print example according to one embodiment of the present invention.
Figure 11A:
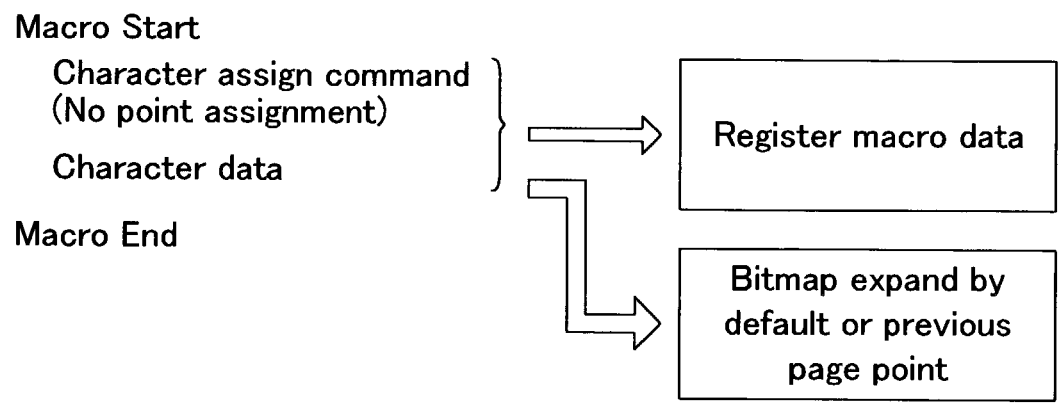
FIGS. 11(A) and 11(B) show explanation diagrams of macro control according to one embodiment of the present invention.
Figure 11B:
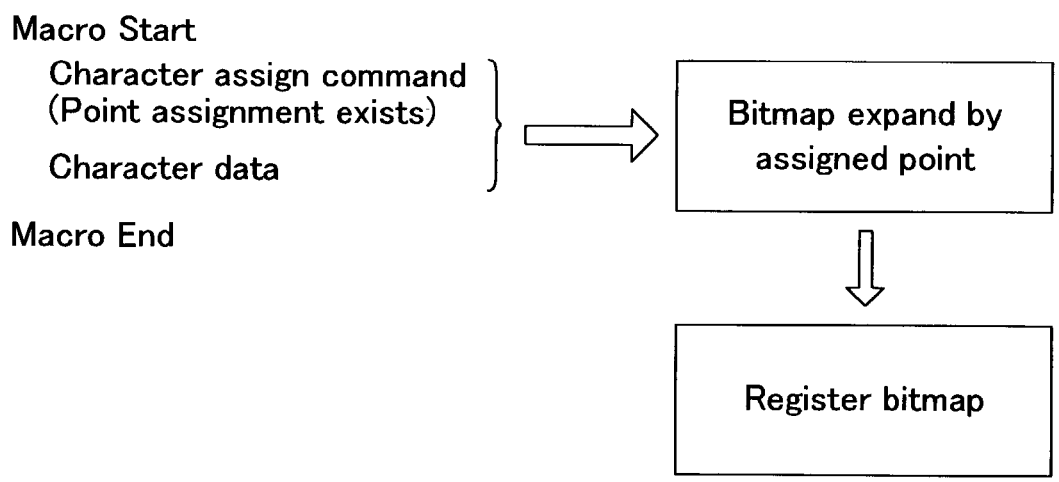
Figures 12, 13:
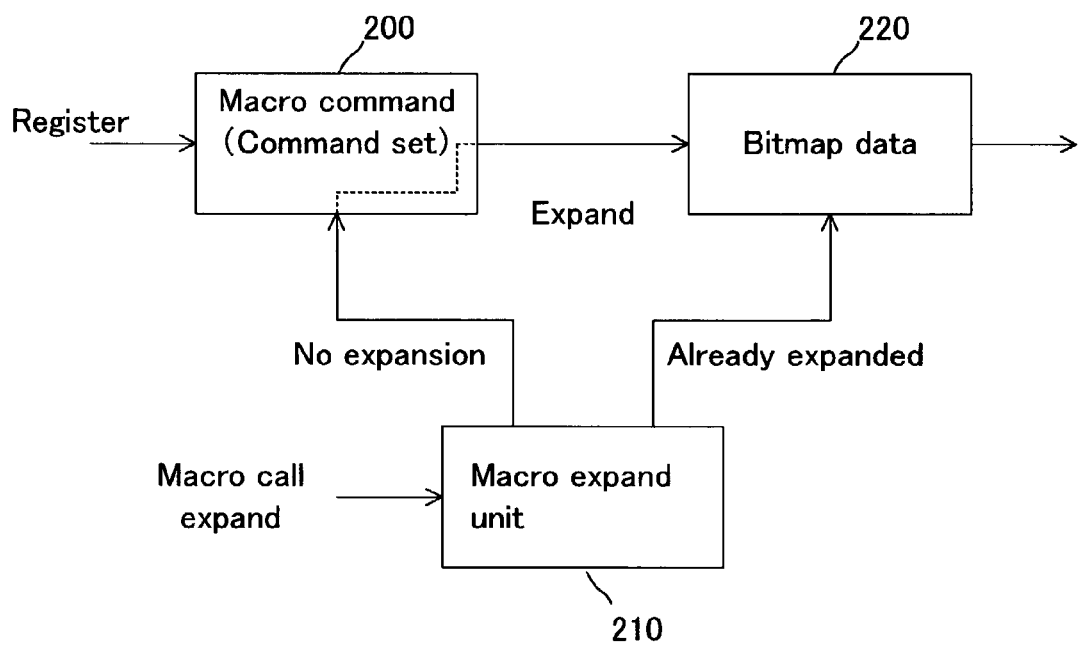
FIG. 12 shows an explanation diagram of an address book as a print example.
FIG. 13 shows an explanation diagram of macro control according to a conventional macro control.

FIGS. 10, 11(A) and 11(B) show explanation diagrams of a preferred macro instruction. FIG. 10 is an example that in case a logo of 'ABC' is to be printed in different paper sizes of A4 and A3. Larger point (character size) of the logo 'ABC' is used for printing on A3 paper than on A4 paper.

As shown in FIG. 11(A), in a macro registration command (commands and data between the start of macro and the end of macro) a character specification command without specifying point number is set together with a character data. Using this method, the bitmap expansion is carried out using a default or the point number having been used in the previous page. At the same time, the character specification command without specifying point number accompanied by a character data is registered as a macro data.

Accordingly, when this macro is called with a desired point number being specified, the bitmap data of this character set having the specified point number can be obtained. For example, by specifying the point number for A4 paper, the logo for A4 can be obtained. Similarly by specifying the point number for A3 paper, the logo for A3 can be obtained.

Meanwhile, as shown in FIG. 11(B), a character specifying command in which the point number is specified as well as a character data is set in a macro registration command (commands and data between the start of macro and the end of macro). This results in the bitmap expansion according to the specified point. At the same time, the bitmap data with a point number being specified is registered as a macro data. Accordingly, the bitmap can be directly called next time or after.

In such a way, high speed processing can be attained using a cashed bitmap producing unchanged print result while maintaining flexibility in macro definition. This is preferable, for example, to a bibliographic data including a logo for corporation or association, company name and address, etc. or to ruled line format.

[Other Embodiments]

These check items can be set from a printer operation panel. Also, the check items can be set variably using printer emulation specified from a host. In addition, a function of automatically selecting macro instruction retention method according to the present invention as well as a function of avoiding automatic selection function (for example, cashing entirely in a bitmap form or retaining entirely as a command data) can be selectively specified from either the operation panel or the host.

Further, in regard to the macro having been determined cashing is ineffective, it may also be possible either to display onto the operation panel or to notify to the sender of the macro. In the aforementioned description, there has been illustrated an electrophotographic printer producing a toner image onto a print medium. However, it may also be possible to apply to a printer of other printing type. As for a print medium, the method can be applied to not only continuous form mentioned above but also to cut medium such as cut form. In addition, the medium is not limited to paper. The method is also applicable to other medium such as film.

To summarize, according to the present invention, the following effects may be obtained:

High speed processing using bitmap can be attained, while maintaining flexibility of macro definition, by expanding a macro instruction to bitmap data in advance, and by determining effectiveness of retaining the expanded bitmap data to select either instruction sets or bitmap data.

Also, the aforementioned determination is performed using the macro instruction sets, which enables to select automatically in the printer. Thus high speed printing may be attained while maintaining flexibility of macro definition by a user.

The foregoing description of the embodiments is not intended to limit the invention to the particular details of the examples illustrated. Any suitable modification and equivalents may be resorted to the scope of the invention. All features and advantages of the invention which fall within the scope of the invention are covered by the appended claims.

What is claimed is:

1. A print controller for generating bitmap data according to print data received from a host and outputting to a printer engine, comprising:

a memory for storing macro data; and
a processing unit for generating said bitmap data by calling said macro data from said memory according to a macro data calling instruction being included in said print data,
wherein said processing unit determines whether the received macro instruction in said print data is an effective instruction set to be expanded and stored as said bitmap data, and stores said bitmap data being expanded from said instruction set into said memory when said instruction set is determined effective, while stores said instruction set into said memory as said macro data when said instruction set is determined ineffective.

2. The print controller according to claim 1 wherein said processing unit expands said instruction set into a bitmap data according to said received macro instruction to generate said bitmap data, determines said effectiveness after generating said bitmap data, and then selects either said bitmap data or said instruction set.

3. The print controller according to claim 1 further comprising an information table storing check items for determining whether said received macro instruction is an effective instruction set to be expanded and stored as said bitmap data.

4. The print controller according to claim 1 wherein said memory stores an identifier of said macro data; a flag indicating whether said macro data is said bitmap data or said instruction set; and said macro data.

5. The print controller according to claim 3 wherein said information table stores said check items corresponding to data types of said macro data.

6. A print control method for generating bitmap data according to a print data received from a host and outputting to a printer engine, comprising the steps of:

generating said bitmap data by calling a macro data stored in a memory according to a macro data calling instruction being included in said print data;
determining whether the received macro instruction in said print data is an effective instruction set to be expanded and stored as said bitmap data;
storing said bitmap data being expanded from said instruction set into said memory for effective instruction set; and
storing said instruction set into said memory as said macro data for ineffective instruction set.

7. The print control method according to claim 6 wherein said determination step comprises the steps of:

expanding said instruction set into a bitmap data according to said received macro instruction; and
determining said effectiveness after generating said bitmap data.

8. The print control method according to claim 6 wherein said determination step comprises the step of:

referring to an information table which stores check items for determining whether said received macro instruction is an effective instruction set to be expanded and stored as said bitmap data to perform said determination.

9. The print control method according to claim 6 wherein each said step for storing said macro data comprise the step of:

storing into said memory an identifier of said macro data, a flag indicating whether said macro data is said bitmap data or said instruction set, and said macro data.

10. The print control method according to claim 8 wherein said determination step comprises the step of:

referring to check items of corresponding data type of said macro data being stored in an information table which stores said check items corresponding to each macro data to determine.

11. A printer for generating bitmap data according to print data received from a host and printing onto a medium, comprising:

a memory for storing macro data;

a processing unit for generating said bitmap data by calling said macro data from said memory according to a macro data calling instruction being included in said print data; and a printer engine for receiving said bitmap data and printing onto said medium, wherein said processing unit determines whether the received macro instruction is an effective instruction set to be expanded and stored as said bitmap data, and stores said bitmap data being expanded from said instruction set into said memory when said instruction set is determined effective, while stores said instruction set into said memory as said macro data when said instruction set is determined ineffective.

12. The printer according to claim 11 wherein said processing unit expands said instruction set into a bitmap data according to said received macro instruction to generate said bitmap data, determines said effectiveness after generating said bitmap data, and then selects either said bitmap data or said instruction set.

13. The printer according to claim 11 further comprising an information table storing check items for determining whether said received macro instruction is an effective instruction set to be expanded and stored as said bitmap data.

14. The printer according to claim 11 wherein said memory stores an identifier of said macro data; a flag indicating whether said macro data is said bitmap data or said instruction set; and said macro data.

15. The printer according to claim 13 wherein said information table stores said check items corresponding to data types of said macro data.

* * * * *